United States Patent
Bunke et al.

[11] Patent Number: 6,064,371
[45] Date of Patent: May 16, 2000

[54] PC MOUSE INCORPORATING ADJUSTABILITY

[75] Inventors: Jay B. Bunke; Scott Ernest Hoaby, both of Rochester, Minn.

[73] Assignee: International Business Machines Corporation, Armonk, N.Y.

[21] Appl. No.: 09/019,659

[22] Filed: Feb. 6, 1998

[51] Int. Cl.[7] .................................................... G09G 5/08
[52] U.S. Cl. ........................ 345/163; 345/157; 345/158
[58] Field of Search .................................. 345/163, 156, 345/157, 158; 463/37

[56] References Cited

U.S. PATENT DOCUMENTS

| | | |
|---|---|---|
| D. 381,970 | 8/1997 | Gasca . |
| 4,465,908 | 8/1984 | Griffith et al. ............................ 463/37 |
| 4,862,165 | 8/1989 | Gart . |
| 5,006,836 | 4/1991 | Cooper .................................... 340/710 |
| 5,058,840 | 10/1991 | Moss et al. . |
| 5,165,630 | 11/1992 | Connor . |
| 5,260,696 | 11/1993 | Maynard, Jr. . |
| 5,265,835 | 11/1993 | Nash . |
| 5,355,147 | 10/1994 | Lear . |
| 5,414,445 | 5/1995 | Kaneko et al. .......................... 345/163 |
| 5,570,112 | 10/1996 | Robinson . |
| 5,576,733 | 11/1996 | Lo . |
| 5,581,277 | 12/1996 | Tajiri . |
| 5,648,798 | 7/1997 | Hamling . |
| 5,823,057 | 10/1998 | Hsien ...................................... 345/161 |
| 5,847,696 | 12/1998 | Itoth et al. .............................. 345/163 |

*Primary Examiner*—Vijay Shankar
*Attorney, Agent, or Firm*—Lawerence D. Maxwell

[57] ABSTRACT

An ergonomic computer mouse has support surfaces that are adjustable in two directions. The mouse includes a pivot mechanism that couples an upper and lower portion of the mouse housing together. The pivot mechanism may allow a user to adjust the upper and lower housing portions in pitch and roll directions with respect to one another.

8 Claims, 2 Drawing Sheets

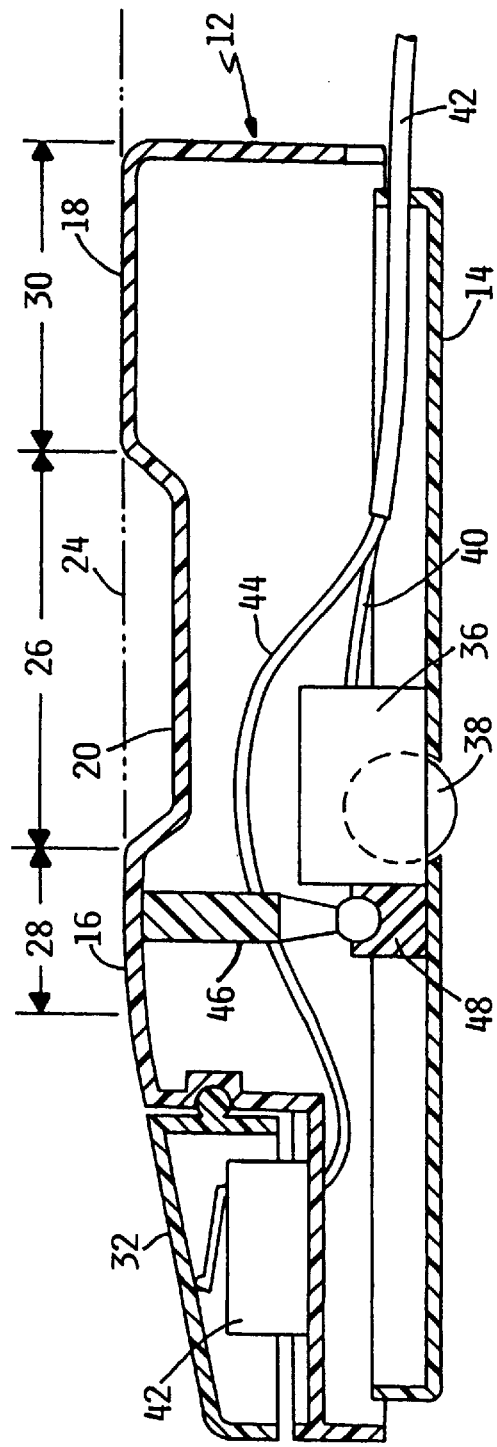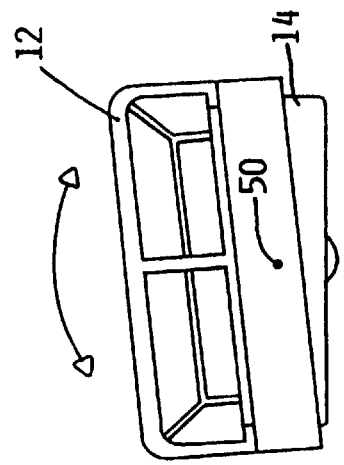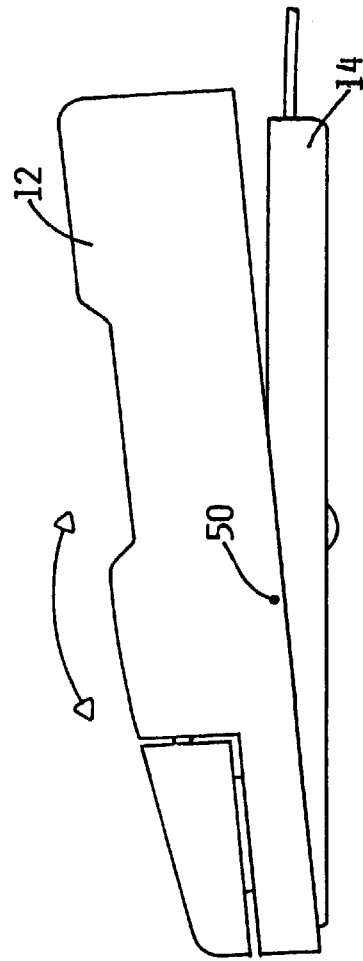

PC MOUSE INCORPORATING ADJUSTABILITY

CROSS-REFERENCE TO RELATED APPLICATION

This application is related to application Ser. No. 09/020,185, filed Feb. 6, 1998, entitled "A META-REST IMPROVED PC MOUSE."

BACKGROUND OF THE INVENTION

1. Field of the Invention

The present invention relates generally to a computer mouse and, more specifically, to an ergonomic mouse for inhibiting repetitive stress injury.

2. Description of the Related Art

Repetitive stress injury (RSI) to computer users is the fastest growing form of workplace injury. Although RSI is not yet well-understood, it is known that RSI occurs from repeated physical movements of body parts, especially the wrists, hands and arms. A common type of RSI that occurs in the wrists is known as Carpal Tunnel Syndrome. Typing on a keyboard and using a computer mouse are potential sources of RSI. A mouse is a well-known input device that a user slides across a table surface such as a desktop to provide position data to a computer via a sensor in the mouse. A pad may be placed on the table surface to provide a more uniform surface on which to slide the mouse. A mouse typically also includes one or more finger-operated button switches for providing additional input. A user generally places his or her hand on the upper surface of the mouse and either rests it on the mouse or lightly grasps the mouse. The user's repetitive movements of activating the button switches and sliding the mouse may place stress on the wrist and hand ligaments and tendons.

A conventional mouse has a housing that slopes at its proximal end or end closest to the user's body. At the time such a mouse was first developed, this sloped housing design was apparently thought to be the most comfortable design for the user, but practitioners in the art have more recently come to believe that it promotes RSI. The sloping promotes a drooping of the wrist-end of the hand toward the table surface, causing an extension of the palm-side carpal ligaments, which is believed to stress them. To the extent that this drooped hand posture contracts the upper hand ligaments and tendons, they may be stressed as well.

Others have enhanced the computer mouse with so-called "ergonomic" mouse pads that have a wrist-supporting pad. Although such a mouse pad may inhibit the undesirable drooped hand posture, it may stress ligaments and tendons in the forearm when a user is reaching forward to position the mouse further from his or her body because the forearm rests on the pad intended to support the wrist. Furthermore, a user's watch band or bracelet pressed into the user's wrist or forearm by the wrist-supporting pad under the weight of the user's hand or forearm may increase stress to the ligaments and tendons.

Others have designed computer mice that position the user's hand in positions other than the substantially flat palm-down position, such as a "handshake" or "joystick" position thought by some to be more natural.

It would be desirable to provide an improved computer mouse that mitigates the possibility of RSI occurring. These problems are satisfied by the present invention in the manner described below.

SUMMARY OF THE INVENTION

The present invention relates to an ergonomic computer mouse having support surfaces that are adjustable in two directions. In addition, the mouse may distribute the mechanical pressure points afforded by the mouse to the metacarpal area because the metacarpal area moves the least under normal mouse operation. Each of these two aspects of the invention is believed to inhibit repetitive stress injury.

The housing has an upper portion pivotally coupled to a lower portion to allow adjustment of the upper and lower portions with respect to one another in two directions. Although the upper portion may have any suitable shape, in an illustrated embodiment the upper surface has a proximal metacarpal support and a distal metacarpal support on its upper surface that are separated by a midsection.

The pivot mechanism preferably allows adjustment in at least pitch and roll directions. The pivot mechanism also preferably includes means for selectably inhibiting and allowing the upper and lower housing portions to be adjusted. This may be a latch mechanism of any suitable type, a frictional resistance mechanism, or any other suitable means.

The metacarpal supports may be arranged to distribute the mechanical pressure points to the metacarpal area of the user's hand. In use, the proximal end of the user's metacarpal hand area rests on the proximal metacarpal support, the distal end of the user's metacarpal hand area rests on the distal metacarpal support, and the remainder of the user's metacarpal hand area between their proximal and distal ends span the midsection. The midsection does not extend above the elevation of the proximal and distal metacarpal supports to inhibit the remainder of the user's metacarpal hand area from contacting the housing and thus being subjected to pressure. In other words, but for their proximal and distal ends, which rest upon the supports, the user's metacarpal hand area does not touch the housing.

The mouse may have one or more button switches and any other features commonly included in a computer mouse. The button switches are preferably disposed in a finger area adjacent the distal metacarpal support that does not extend above the elevation of the distal and proximal metacarpal supports.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 4 is an enlarged sectional view taken on line 4—4 of FIG. 1;

FIG. 5 is a side view showing adjustment of the upper and lower housing portions relative to one another in a pitch direction; and FIG. 6 is a side view showing adjustment of the upper and lower housing portions relative to one another in a roll direction.

DESCRIPTION OF PREFERRED EMBODIMENTS

Figure 1:
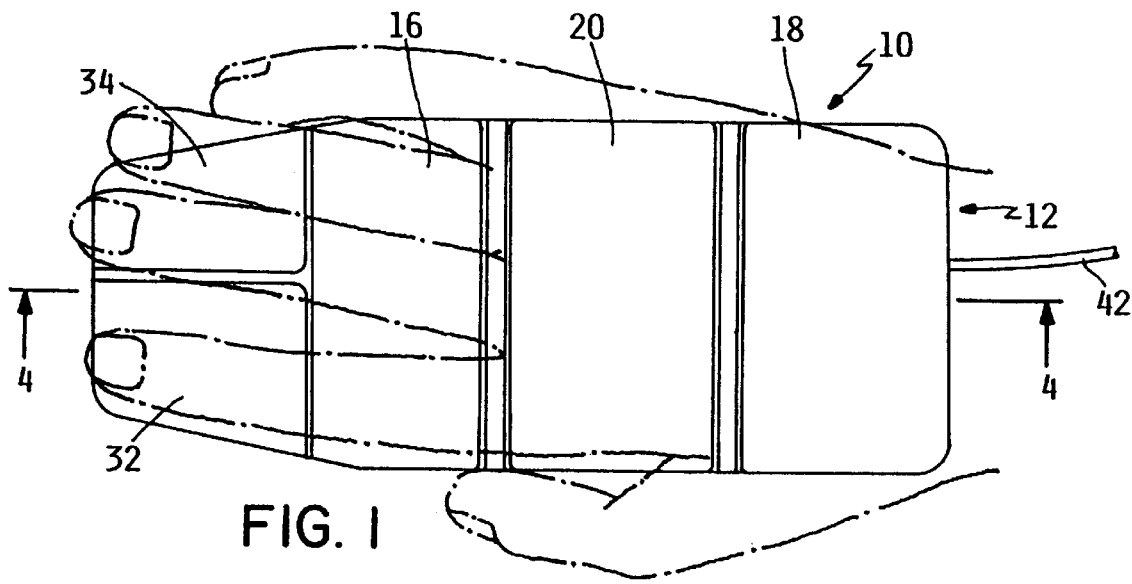
FIG. 1 is a top view of the mouse, with a user's hand indicated in broken line.
Figure 2:
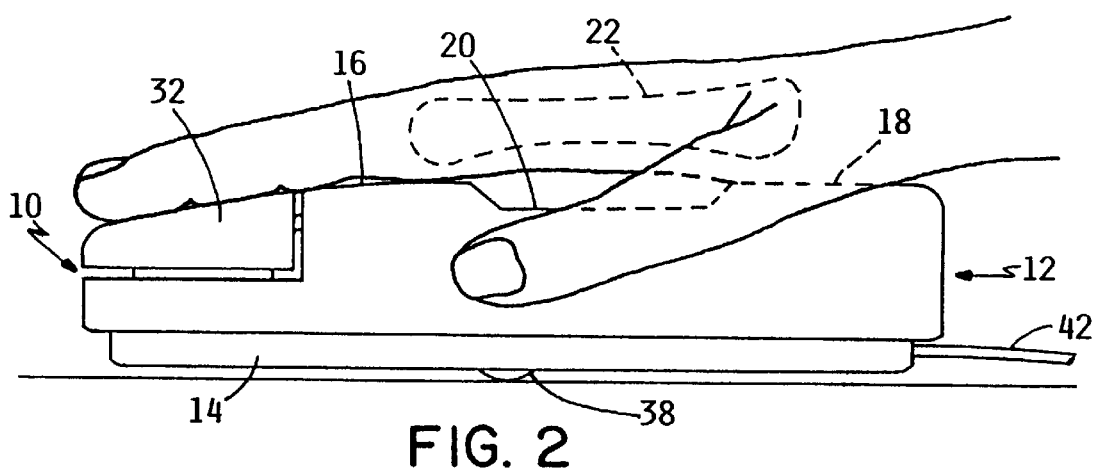
FIG. 2 is a side view of the mouse, showing the hand position.
Figure 3:
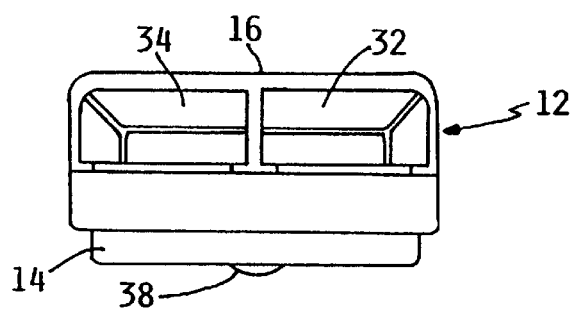
FIG. 3 is a front view of the mouse.

As illustrated in FIGS. 1–4, an ergonomic computer mouse has a housing 10 that includes an upper housing portion 12 and a lower housing portion 14. Upper housing portion 12 has a distal metacarpal support 16 and a proximal metacarpal support 18 that are separated by a midsection 20. As illustrated in FIG. 2, in use, the user's metacarpal hand region spans midsection 20. The term "metacarpal hand region" as used in this patent specification refers the portion of a human hand that is defined by the metacarpal bones 22, illustrated in dashed line in FIG. 2. Metacarpal bones 22 are those that connect the wrist bones to the phalanges or finger bones. The metacarpal-phalangeal region is the region of the hand where the fingers meld with the palm, and it is this part that rests atop distal metacarpal support 16. The wrist end of the hand rests atop proximal metacarpal support 18.

Supports 16 and 18 may be of any suitable shape, but are preferably elongated in the direction perpendicular to the longitudinal axis of the mouse and thus, when the mouse is in use, perpendicular to the user's forearm. An elongated shape is important because it provides support for the user's hand across its width. In the illustrated embodiment, each of supports 16 and 18 is substantially flat or planar for the same reason, but could in other embodiments have any suitable contours or padding for comfort.

Similarly, although in the illustrated embodiment midsection 20 is shown as a slight depression or concavity in upper housing portion 12, midsection 20 may have any suitable structure of any suitable shape because its function is only to separate supports 16 and 18. An important point, however, is that no portion of midsection 20 extends above a plane 24 extending between supports 16 and 18. Although it may be convenient to visualize such a plane 24 for reference purposes, the term "plane" is intended only to generally define the relative elevations of supports 16 and 18 without regard to minor deviations due to contours or other potential features that may exist in certain embodiments of the invention. The point is that, in use, the midportion of the user's metacarpal hand region does not rest on housing 10 and thereby exert pressure on the tendons in that region. Proximal metacarpal support 18 supports the majority of the weight of the user's hand, and distal metacarpal support 16 supports the remainder of the weight. To at least some extent, the inherent cupping or concavity of the region generally known as the palm aids this function. Accordingly, midsection 20 preferably has a length 26 sufficiently great to span the metacarpal hand region. The size of the palm or metacarpal hand region, of course, varies from individual to individual, with particularly significant variance between the palms of males and females. Length 26 of a preferred embodiment of the invention should therefore be selected in accordance with standard ergonomic design practice. That is, to select dimensions that best accommodate the vast majority of females and the vast majority of males, from a small adult female to a large adult male. Standard ergonomic practice is to design from the 2.5 percentile female to the 97.5 percentile male. Applying this principle to the present invention, length 26 is preferably approximately 3.6 centimeters (1.4 inches). The length 26 of midsection 20 is important, because if it is too small a user's metacarpal hand region could not properly extend between supports 16 and 18, and if it is too large the mouse would be unwieldy. The lengths 28 and 30 of distal and proximal metacarpal supports 16 and 18, respectively, are not as important but should be of sufficient length to support the intended regions of a user's hand, such as at least approximately 2.5 centimeters (1.0 inch) for proximal metacarpal support 18 and at least approximately 1.3 centimeters (0.5 inches) for distal metacarpal support 16. The total length of proximal and distal metacarpal supports 18 and 16 and midsection 20 should preferably be at least approximately 9.2 centimeters (3.6 inches) to accommodate the 97.5 percentile male. Such a mouse is considerably longer than a conventional mouse.

It should be noted that although in the illustrated embodiment lengths 26, 28 and 30 are preferably selected to provide a mouse that accommodates the majority of individuals, in other embodiments the mouse may have an adjustable midsection or adjustable metacarpal supports. A user could increase or decrease the separation between the metacarpal supports to more closely fit the size of his or her hand. Such alternative means for supporting a user's metacarpal hand region can readily be designed by persons skilled in the art.

Immediately adjacent to and forward of distal metacarpal support 16 is a finger area over which a user's fingers extend. In the illustrated embodiment of the invention, the finger area includes two button switches 32 and 34 that function in the same manner as those of a conventional mouse. An important point is that the finger area is below plane 24 so that the user's fingers curl downwardly in a natural position to operate switches 32 and 34.

In total, housing 10 is slightly longer than the housing of a conventional mouse, which is generally sized to fit beneath the palm of a user's hand, but housing 10 is nonetheless roughly the length and width of a human hand so that a user can grasp it and move it about on a flat surface, as with a conventional mouse. In other words, although housing 10 is slightly larger than that of a conventional mouse, it is not so to the point of being unwieldy or incapable of being operated in essentially the same manner as a conventional mouse.

With regard to its operation, the user may slide the mouse across a flat surface to provide position information to a computer (not shown) in essentially the same manner as a conventional mouse. As illustrated in FIG. 4, a suitable position sensor 36 is mounted in lower housing portion 14. A trackball 38 protrudes through an opening the underside of housing 10 and transmits motion to position sensor 36 when the user slides the mouse on the surface. A typical position sensor 36 of the type used in computer mice responds to longitudinal and lateral movement of trackball 38 with respect to the surface on which it rolls, but sensor 36 may be of any suitable type. As in a conventional mouse, the signals produced by sensor 36 are transmitted via wires 40 enclosed in the mouse cable 42. Also, as in a conventional mouse, switches 32 and 34 include suitable contact mechanisms 42, and the signals they produce are transmitted via wires 44 also enclosed in mouse cable 42.

In accordance with another aspect of the invention, upper housing portion 12 and lower housing portion 14 are adjustable relative to one another. Upper housing portion 12 has a protuberance 46 with a ball-shaped end that engages a correspondingly shaped socket 48 in lower housing portion 12. Protuberance 46 and socket 48 together define a pivot mechanism. The pivot mechanism promotes adjustability in pitch and roll directions about a point 50, as illustrated in FIGS. 5 and 6, respectively. By adjusting the mouse in the pitch direction a user can adjust the elevation of supports 16 and 18 relative to the surface on which the mouse is used. By adjusting the mouse in the roll direction a user can adjust the mouse to follow the natural tendency of the hand to assume a position slightly rotated at the wrist with the plane of the palm more perpendicular to the surface on which the mouse rests. Although in the illustrated embodiment the pivot mechanism is a ball-and-socket arrangement, a gimbal mechanism or any other mechanism that promotes adjustment in at least the pitch and roll directions would be suitable. Also, pivot point 50 could in certain embodiments be placed in locations other than as shown in the illustrated embodiment. Lastly, although in the illustrated embodiment the pivot point for the pitch and roll directions are coincident, they may be located apart from one another in other embodiments. The axes about which housing portions 12 and 14 may be adjusted may not even be pivot "points" in certain embodiments, as upper and lower housing portions 12 and 14 could be connected by pairs of adjustable posts, springs or some other pivot mechanism that does not pivot about a single, predefined point. The pivot mechanism or mechanisms may be disposed at any suitable location or locations in housing 10.

The pivot mechanism includes frictional resistance means for inhibiting relative movement of upper and lower housing portions 12 and 14 during use of the mouse. One suitable frictional resistance means for inhibiting such movement may be that the ball-shaped end of protuberance 46 fits tightly within socket 48 such that frictional resistance inhibits upper and lower housing portions 12 and 14 from being moved relative to one another in response to the normal amount of force exerted by a user's hand during operation of the mouse. To adjust upper and lower housing portions 12 and 14, the user must exert a substantially greater force to overcome the frictional resistance. Although frictional resistance may by itself constitute a suitable means for inhibiting relative movement of upper and lower housing portions 12 and 14 during use of the mouse, a set-screw, pushrod or ring movable into and out of contact with protuberance 46, a sliding latch, or any other suitable means may be included for this function.

Other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. An ergonomic computer mouse, comprising:

a housing having a lower portion and an upper portion;

a position sensor coupled to said housing for producing signals representative of longitudinal and lateral movement of said housing on a flat surface; and a pivot mechanism adjustably coupling said upper portion to said lower portion in two mutually perpendicular directions, said pivot mechanism including means for selectably inhibiting and allowing said upper and lower portions to be adjusted.

2. The ergonomic computer mouse recited in claim 1, wherein said directions are pitch and roll.

3. The ergonomic computer mouse recited in claim 1, wherein said pivot mechanism comprises a ball-and-socket mechanism, with a ball-like protuberance connected to one of said upper and lower portions and a mating socket connected to the other of said upper and lower portions.

4. A method for using an ergonomic computer mouse having a housing with a longitudinal axis and a lateral axis, and a position sensor coupled to said housing for producing signals representative of longitudinal and lateral movement of said housing on a flat surface, said housing having a lower portion pivotally coupled to an upper portion in two mutually perpendicular directions, the method comprising the steps of:

pivoting said upper portion relative to said lower portion in a first direction on a first axis;

adjusting a pivoting mechanism to inhibit further pivoting movement of said upper portion relative to said lower portion following said pivoting step;

resting a hand on said upper portion; and moving said housing on a flat surface in longitudinal and lateral directions using said hand resting on said upper portion.

5. The method recited in claim 4, wherein said first direction is pitch and said first axis is parallel to said lateral axis.

6. The method recited in claim 5, further comprising the step of pivoting said upper portion relative to said lower portion in a roll direction on an axis parallel to said longitudinal axis.

7. The method recited in claim 4, wherein said first direction is roll and said first axis is parallel to said longitudinal axis.

8. The method recited in claim 7, further comprising the step of pivoting said upper portion relative to said lower portion in a pitch direction on an axis parallel to said lateral axis.

* * * * *